United States Patent Office 3,756,981
Patented Sept. 4, 1973

3,756,981
PROCESS FOR THE DYEING OF POLYURETHANE TEREPHTHALATE GRANULES
Siegfried Breitschaft, Augsburg, Germany, assignor to Farbwerke Hoechst Aktiengesellschaft vormals Meister Lucius & Bruning, Frankfurt am Main, Germany
No Drawing. Filed Apr. 28, 1971, Ser. No. 138,327
Claims priority, application Germany, Apr. 21, 1970, P 20 18 976.8
Int. Cl. C08g 51/04
U.S. Cl. 260—40 R
3 Claims

ABSTRACT OF THE DISCLOSURE

A process for dyeing linear polyester granules destined for injection moulding, which comprises mixing the polyester granules with dyestuff and/or colouring pigments and a pulverized alkali metal salt of a wax oxidate or of a polyethylene oxidate, which process yields granules, onto which the dyestuff or pigments adhere extremely well, and which granules can be processed into injection moulded shaped articles showing a very homogeneous and uniform colouring.

---

The use of linear polyesters in the field of fibers and sheets involves the requirement to use the polyesters not only in their natural colour, but also in a dyed form. Of the known processes for the dyeing of plastics, the most simple dyeing process for thermoplastic material, i.e. the dyeing in the dry state, according to which the dyeing of the plastic material is effected during the final processing, cannot be used for linear polyesters, as well as for a series of other plastics, since a completely homogeneous distribution of the dyestuff cannot be obtained. The dyeing of linear polyesters has therefore to be effected in accordance with other methods that are more complicated and more expensive.

There are virtually two processes, according to which dyed polyesters are presently obtained: either colouring pigments suspended in glycol are introduced into the polyester melt at an appropriate stage during the ester interchange, or they are introduced in the course of the polycondensation of the glycol terephthalate into the polyester melt more or less completely condensed, or ready polyester granules are used as starting products, which are re-granulated with the colouring pigment, while adding adhesion agents, by means of extruders.

The use of the former process implies that the colouring pigments added are stable at the high temperature range of the melt condensation (270–290° C.), and that they are also indifferent to the polyester. However, there are only few pigments (for example carbon black, TiO₂) which meet these requirements. Another drawback is the fact that deposits are found in those reactors, where polyesters are prepared in the presence of pigments, which deposits may lead to an operational breakdown, or in any case they require a frequent cleaning of the reactors.

The latter process, indeed, provides a considerably greater choice of pigments, however, an important drawback is the fact that the polyester is subjected to a great thremal stress, while it is passing through the extruders used for homogenizing and re-granulating, which may lead to a considerable decomposition of the polyester. In order to obtain a homogeneous mixture of the starting granules and the pigment, it is also necessary to admix adhesion agents, which, on the other hand, must be compatible with the polyester and shall not cause any additional decomposition in the course of regranulation, or involve any other modification of the properties of the polyester. The choice of suitable substances is rather limited (for example, paraffines, polyglycols). Another drawback is the fact that adhesion agents lead to a deterioration of the draw-in properties in the course of re-granulation.

Whereas polyesters, which are to be processed into fibers and sheets, may still be dyed satisfactorily, according to the two processes mentioned above, in spite of their drawbacks, it becomes evident that these methods can only be applied in an even more limited way to the dyeing of high molecular weight polyesters which have gained more and more importance in recent times, with respect to the injection-moulding process.

Such high molecular weight polyesters destined for the injection moulding process, which have a reduced specific viscosity (RSV) of from 1.0 to 2.0 dl./g. (measured with a solution of 1% strength in phenol-tetrachlorethane 60:40 at 25° C.)—as compared against the fiber and/or sheet quality with a RSV value of from 0.4 to 0.9 dl./g.—cannot be prepared according to the known processes of melt condensation. They are obtained in such a way that the melt condensation is interrupted at a determined and easily attainable condensation degree, and is then continued in a solid phase, until the desired molecular weight is obtained. If those polyesters are dyed according to the former process during the melt condensation, it becomes evident that for some pigments a considerably longer time is needed for the subsequent solids condensation, in order to arrive at RSV values that may be obtained and can be compared with the undyed material.

The process of re-granulation, too, is in principle suitable for the dyeing of the high molecular weight linear polyesters. However, as there is a growing tendency towards a thermal degradation reducing the molecular weight in the course of re-granulation, with an increasing RSV value, the effect of the solids condensation is in any case partly annulled.

A process has now been found, according to which it is possible to dye high molecular weight linear polyesters destined for injection moulding, while avoiding the above-mentioned drawbacks and difficulties.

The present invention provides a process for the dyeing of linear polyester granules destined for injection moulding, in particular, polyethylene terephthalate granules, the polyesters having a RSV value in the range of from 1.0 to 2.0 dl./g., which comprises intimately mixing the polyester granules, which may, optionally, already contain pigments, with from 0.1 to 2% by weight, calculated on the amount of granules used, of a dyestuff or colouring pigment powder, and with from 0.2 to 2.0% by weight of a pulverized alkali metal salt of a wax oxidate having an acid number of from 80 to 150, or of a polyethylene oxidate having a molar weight of from 400 to 1000 and an acid number of from 60 to 120, at a temperature in the range of from 60 to 150° C., until the total amount of the powder mixture adheres to the surface of the granules.

The claimed process is particularly suitable for the dyeing of polyethylene terephthalate granules serving for the processing into injection-moulded articles and having a RSV value of from 1.2 to 1.7, preferably from 1.2 to 1.5 dl./g., which may be present in any form, for example in the form of ribbon or cylinder-shaped granules, however, the process is also applicable to polyester granules which have a lower or higher molecular weight (RSV value approximately 0.5 to 2.0). For the dyeing process of the invention, which is carried out at a temperature in the range of from 60 to 150° C., preferably from 60 to 120° C., and which is therefore effected while treating the granules extremely carefully, a large number of dyestuffs and/or colouring pigments can be applied—naturally in a finely pulverized form. There are mentioned, for example, inorganic and organic pigments, such as carbon black, titanium dioxide, cadmium sulfides, ferric oxides, ultramarines, phthalocyanines, etc., as well as organic dyestuffs, for example azo dyestuffs. It goes without saying that mixtures thereof may also be used. It is also possible to modify the shade of polyesters already containing pigments, for example, a product which has been dyed white, by means of titanium dioxide in the course of the melt condensation, may be given a gray colour by subsequently adding carbon black in accordance with the invention.

The pigment proportion depends on the desired colour intensity. An amount of from 0.1 to 0.5% by weight, calculated on the amount of polyesters to be dyed, is generally sufficient for many dyestuffs, in order to obtain a deep color shade. However, in accordance with the requirements, for example, in order to arrive at an additional stabilization against ultra-violet rays, it is also possible to use larger amounts of pigments of up to about 2% by weight.

By alkali metal salts of wax oxidates there are to be understood the lithium, potassium, and preferably sodium salts of wax acid mixtures which are obtained by oxidation of natural waxes, such as carnauba wax, ouricouri wax, candelilla wax, or raw montan wax. These wax acid mixtures contain preferably straight-chain saturated aliphatic monocarboxylic acids having from 18 to 36, preferably from 20 to 30 carbon atoms, as well as small amounts of higher dicarboxylic acids, and esters of straight-chain aliphatic monoalcohols having from 18 to 36 carbon atoms with those acids. Particularly suitable are the sodium salts of the wax acid mixtures having an acid number of from 80 to 150, preferably from 90 to 120, which mixtures and obtained by the chromosulfuric acid oxidation of deresinified or non-deresinified raw montan wax.

It is also possible to use the alkali metal salts of oxidized polyethylenes having a molar weight of from about 400 to 1000, the acid numbers of which have been in the range of from about 60 to 120 prior to the neutralization with alkali metal hydroxide. Salt mixtures may also be used. The required amount of alkali metal salt of wax acid and/or polyethylene oxidate is at least 0.2% by weight, calculated on the amount of granules to be dyed, and may be up to about 2% by weight.

The weight ratio to be chosen between the dyestuff and/or colouring pigment and the alkali metal salt of the wax oxidate is generally in the range of from 1:0.25 to 1:8. However, as the nature of the colouring component has to be taken into consideration, too, good results can also be obtained with another mixture ratio in some cases.

The dyeing of the high molecular weight linear polyester granules is effected advantageously immediately after the solids condensation, i.e. during the cooling process, when the granules have reached a temperature of between 60 and 150° C. approximately. According to the method of operation of the condensation apparatus, the admixture may be carried out both continuously and discontinuously. The colouring pigment and the alkali metal salt can be added separately, or these components are mixed first, and the mixture is then added to the granules. It is also possible, according to this process, to use mixtures of the dyestuff and the alkali metal salt which have been agglomerated before and have subsequently been ground. The mixture is effected in apparatuses common for mixing processes of this kind. The so-called eccentric tumbling mixers have proved to be particularly suitable.

In the case of the high molecular weight polyester granule. A separation of the pigment from the granules has not been observed even after a long transport, and there has never been any dusting, when handling granules thus dyed.

The dyed polyester granules are preferably processed—particularly into injection-moulded articles and/or semi-finished goods—by means of screw injection moulding machines and extruders, in which process no additional auxiliaries have to be added—in contradistinction to granules that have either not been dyed at all, or that have been dyed according to other methods—which auxiliaries are otherwise necessary, in order to accelerate the crystallization process with the injection-moulded article, and to improve the mould release properties of the moulded article, and to improve the mould release properties of the moulded articles.

The following examples serve to illustrate the process of the invention.

EXAMPLE 1

A previously prepared mixture of 4 kg. of cadmium sulfide (type ®Cadmopur GN of Bayer Leverkusen, Germany) and 3.2 kg. of the sodium salt of a raw montan wax oxidate having the acid number of 110 was added to 800 kg. of polyethylene terephthalate granules in the form of cylinders (granule size: diameter—2 mm., length—4 mm.), which were condensed in the solid phase to a RSV value of 1.45 and were then cooled from condensation temperature (about 235° C.) to about 120° C. in a tumbling apparatus; this reaction mixture was subsequently treated in an eccentric tumbling mixer for 15 minutes, with a rate of 10 revolutions per minute. After that the mixture was cooled to 25° C. with 1 revolution per minute. The pigment, together with the sodium salt, completely adhered to the granules. The injection-moulded articles prepared by means of a screw injection moulding machine show a homogeneous distribution of the pigment.

EXAMPLE 2

800 kg. of polyethylene terephthalate granules (RSV value: 1.45) were mixed with 8 kg. of cadmium sulfide and 4 kg. of the sodium salt of the raw montan wax acid having the acid number of 110, as has been described in Example 1 above.

In this case, too, the pigment completely adhered to the surface of the granules.

EXAMPLE 3

800 kg. of granulated polyethylene terephthalate (RSV value 1.4), to which 0.5% of titanium dioxide (®Kronos CL 220, Titangesellschaft, Germany) had been added already in the course of melt condensation, were mixed, according to the manner described in Example 1 above, with 1.6 kg. of carbon black (type ® Sicoplast-schwartz of Messrs. Siegle, Germany), 400 g. of ultra-marine blue (type W 33 89, Blaufarbenwerk Marienberg, Germany), and 3.2 kg. of the sodium salt of a raw montan wax oxidate having the acid number of 114. The injection-moulded articles prepared from the dyed granules showed and extremely uniform gray colouring.

EXAMPLE 4

200 kg. of polyethylene terephthalate granules (RSV value: 1.40) were mixed with 1 kg. of titanium dioxide, 400 g. of carbon black, 100 g. of ultramarine blue, and 1 kg. of the sodium salt used in Example 3, and were cooled in a tumbling machine.

In this case, too, the pigments adhered to the granules to a sufficient degree. The injection-moulded articles prepared on the basis of these granules showed a similar colouring as those of Example 3.

EXAMPLE 5

200 kg. of polyethylene terephthalate granules (RSV value: 1.4) were mixed, under the conditions described above, with 1.3 kg. of a ground colouring concentrate consisting of 800 g. of sodium salt of a raw montan wax acid having the acid number of 110, 500 g. of carbon black (® Corax P, Degussa, Germany), which had been prepared by intensive kneading at an elevated temperature.

Thin sections of injection-moulded articles prepared on the basis of these granules showed a very uniform and fine distribution of the carbon black.

EXAMPLE 6

800 g. of sodium salt of a raw montan wax acid having the acid number of 110 and 500 g. of carbon black (® Corax P) were added, one after the other, to 200 kg. of polyethylene terephthalate (RSV value: 1.4), and the components were mixed, as has been described in Example 1.

The distribution of the carbon black in the injection-moulded articles prepared from the reaction mixture corresponded to that of the injection-moulded articles of Example 5.

EXAMPLE 7

As has been described in Example 1, 800 kg. of polyethylene terephthalate were dyed, at a temperature of about 120° C., with a mixture consisting of 4 kg. of cadmium sulfide and 3.2 kg. of the sodium salt of a polyethylene wax oxidate having the acid number of 118.

By processing on a screw injection moulding machine, homogeneously dyed injection-moulded articles were obtained.

EXAMPLE 8

2 kg. of polyethylene terephthalate granules (RSV value: 1.42) were heated at 120° C. in a drying cabinet, and were then intimately mixed with 5 g. of a red organic dyestuff from the series of the so-called dyestuffs soluble in fat (Fettrot HRR Farbwerke Hoechst, Germany), and 8 g. of the sodium salt of a raw montan wax oxidate having the acid number of 110.

After 4 hours of drying at 140° C. and a pressure of 0.5 mm. of mercury, the granules were processed, by means of the injection moulding machine, into shaped articles which were dyed in a completely homogeneous manner.

What is claimed is:

1. A process for the dyeing of linear polyester granules destined for the processing by injection moulding, in particular, polyethylene terephthalate granules, the polyesters having a reduced specific viscosity in the range of from 1.0 to 2.0 dl./g., which comprises intimately mixing the polyester granules, which may contain pigments, with from 0.1 to 2.0% by weight, calculated on the amount of granules used, of a dyestuff or colouring pigment powder, and with from 0.2 to 2.0% by weight of a pulverized alkali metal salt of a wax oxidate having an acid number of from 80 to 150, or of an alkali metal salt of polyethylene oxidate having a molar weight of from 400 to 1000 and an acid number of from 60 to 120, at a temperature in the range of from 60 to 150° C., for such a time until the total amount of the powder mixture adheres to the surface of the granules.

2. A process as claimed in claim 1, which comprises using a mixture consisting of the dyestuff and/or colouring pigment and the sodium salt of a raw montan wax oxidate having an acid number in the range of from 90 to 120.

3. Dyed granules of linear polyesters having a specific viscosity of from 1.0 to 2.0 dl./g. obtained in accordance with claim 1.

References Cited

UNITED STATES PATENTS

| 3,575,931 | 4/1971 | Sherman | 260—28 X |
|---|---|---|---|
| 3,479,318 | 11/1969 | Jackson et al. | 260—40 R |
| 3,002,942 | 10/1961 | Zoetbrood | 260—40 P X |
| 3,607,761 | 9/1971 | Feighner et al. | 260—413 X |
| 3,560,537 | 2/1971 | Eller | 260—413 |
| 3,458,804 | 7/1969 | Wolf et al. | 260—40 R X |
| 3,590,000 | 12/1971 | Palermiti et al. | 260—40 R X |

OTHER REFERENCES

Renfrew et al.: Polythene (1957), p. 285.

W. M. McSpadden: Def. Publ. T871,008 (publ. Feb. 24, 1970.

ALLAN LIEBERMAN, Primary Examiner

S. M. PERSON, Assistant Examiner

U.S. Cl. X.R.

106—272; 260—28 40 P